United States Patent
Muraoka et al.

(10) Patent No.: US 6,520,229 B1
(45) Date of Patent: *Feb. 18, 2003

(54) PNEUMATIC TIRE HAVING IMPROVED STATIC DISCHARGE CHARACTERISTICS

(75) Inventors: Kiyoshige Muraoka, Kobe (JP); Toshiro Matsuo, Kakogawa (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 864 days.

(21) Appl. No.: 08/577,217

(22) Filed: Dec. 22, 1995

(30) Foreign Application Priority Data

Dec. 22, 1994 (JP) ................................. 6-320856

(51) Int. Cl.⁷ ........................... B60C 1/00; B60C 11/00; B60C 19/08
(52) U.S. Cl. ............................... 152/152.1; 152/209.5; 152/DIG. 2
(58) Field of Search .................. 152/209 R, 152.1, 152/DIG. 2, 209.5; 524/495, 496

(56) References Cited

U.S. PATENT DOCUMENTS

| | | | | |
|---|---|---|---|---|
| 2,339,546 A | * | 1/1944 | Hanson | 152/DIG. 2 |
| 5,143,967 A | * | 9/1992 | Krishnan et al. | 524/495 |
| 5,173,135 A | | 12/1992 | Tokieda et al. | |
| 5,447,971 A | * | 9/1995 | Bergh et al. | 152/209 R |
| 5,518,055 A | * | 5/1996 | Teeple et al. | 152/DIG. 2 |
| 5,718,781 A | * | 2/1998 | Verthe et al. | 152/209 R |

FOREIGN PATENT DOCUMENTS

| | | | | |
|---|---|---|---|---|
| CH | 597 008 | | 3/1978 | |
| EP | 0 501 227 A1 | | 9/1992 | |
| EP | 0 705 722 A1 | | 4/1996 | |
| FR | 1449597 | | 8/1966 | |
| GB | 544757 | * | 4/1942 | 152/152.1 |
| JP | 5247202 | | 12/1977 | |
| JP | 61122003 | | 6/1986 | |
| JP | 2-45202 | * | 2/1990 | 152/209 R |
| JP | 2202936 | | 8/1990 | |
| JP | 342312 | | 2/1991 | |
| JP | 7102120 | | 4/1995 | |

OTHER PUBLICATIONS

Tejraj M. Aminabhavi et al., "Electrical Resistivity of Carbon–Black–Loaded Rubbers," Rubber Chemistry and Technology, vol. 63, pp 451–471.Jul. 1990.*
English language abstract of JP–A–3–42312.
English language abstract of JP–A–7–102120.
English language abstract of JP–A–2–202936.
English language abstract of JP–A–61–122003.

* cited by examiner

Primary Examiner—Geoffrey L. Knable
(74) Attorney, Agent, or Firm—Birch Stewart Kolasch & Birch LLP

(57) ABSTRACT

A pneumatic tire is disclosed having an improved electric conductivity and an excellent rolling resistance, which includes a tread and a conductive thin film provided on the surface of the tread continuously in the circumferential direction of the tire, wherein the conductive thin film has a thickness of not more than 0.5 mm and a volume resistivity of not more than $10^5$ Ω·cm, and the tread is made from a rubber composition comprising a diene rubber and 40 to 100 parts by weight of silica having a BET specific surface area of 100 to 300 m²/g per 100 parts by weight of the diene rubber, the content of silica being at least 50% by weight based on the whole filler incorporated in the composition. The conductive thin film may be prepared from a rubber composition comprising at least 10 parts by weight of carbon black per 100 parts by weight of a rubber.

7 Claims, 3 Drawing Sheets

PNEUMATIC TIRE HAVING IMPROVED STATIC DISCHARGE CHARACTERISTICS

BACKGROUND OF THE INVENTION

The present invention relates to a pneumatic tire for automobiles having improved characteristics of static discharge, and more particularly to a pneumatic tire including a tread having an improved electric conductivity.

In recent years, it is increasingly demanded to reduce a fuel cost for automobiles. Since tire performances, particularly the rolling resistance of a rubber material constituting a tread of tires, have a great influence on the fuel cost, development of rubber compositions for tire treads having a low rolling resistance has been made.

Rubber compositions incorporated with a reduced amount of carbon black or rubber compositions incorporated with an inorganic filler such as silica are proposed as rubber compositions having a low rolling resistance. For instance, rubber compositions for low fuel cost tires containing silica are disclosed in European Patent No. 0501227, Japanese Patent Publication Kokai No. 5-271447 and Japanese Patent Publication Kokoku No. 5-80503.

At one time, as disclosed in Japanese Patent Publication Kokai No. 61-122003, since a metal was mainly used in a car body and static electricity generating between a tire tread and the ground was a problem rather than the static electricity generating from the car body, the problem was solved, in order to reduce noise of radio, by raising the electrical resistance of tires to more than 200 MΩ so as not to cause the static electricity of tires to flow to the car body. However, plastic materials are widely used in recent cars for lightening, and, static electricity accumulated in cars increases, so that generation of static electricity from the car body increases. Moreover, if a rubber composition containing silica is used in the tread of tires, the electrical resistance of such tires is at least 2000 MΩ and far exceeds the level of the above-mentioned prior art. How to discharge the static electricity accumulated in cars is important for such cars.

Diene rubbers have been generally used in treads of tires. Since the diene rubbers themselves are poor in electric conductivity, the conductivity has been raised by incorporating carbon black having a conductivity into rubber compositions. Consequently, if it is contemplated to reduce the rolling resistance, namely to reduce fuel cost, by incorporating an inorganic filler such as silica or by decreasing the amount of carbon black to be incorporated, the conductivity of tread rubber compositions is markedly decreased due to the incorporation of silica which is poor in conductivity or due to decrease of the amount of carbon black incorporated.

The static electricity accumulated in a car body flows from a wheel rim to bead portions of the tire, then to side walls and reaches a tread a portion of the tire. If the rubber material of the tread is poor in conductivity, the static electricity cannot flow to the ground and is accumulated in the tire and car body. Therefore, if low conductive tires are attached to a car, noise of radio, a spark and the like generate due to static electricity accumulated in the car. In particular, sparking is very dangerous for cars using a low boiling hydrocarbon fuel such as gasoline.

It is an object of the present invention to provide a pneumatic tire which can satisfy demands contrary to each other, namely reduction of rolling resistance and impartment of electric conductivity.

A further object of the present invention is to provide a pneumatic tire including a tread having excellent rolling characteristics and improved static discharge characteristics.

Another object of the present invention is to provide a tread having a thin conductive rubber layer on its surface.

Still another object of the present invention is to provide a static dischargeable pneumatic tire having a thin conductive rubber layer on the surface of its tread.

These and other objects of the present invention will become apparent from the description hereinafter.

SUMMARY OF THE INVENTION

It has been found that even if the tread rubber itself is poor in electric conductivity, the conductivity of the tread of tires can be improved without substantial adverse effect on performances by providing a thin film having a good conductivity on the tread surface.

In accordance with the present invention, there is provided a pneumatic tire comprising a tread and a conductive thin film provided on the surface of said tread continuously in the circumferential direction of the tire, wherein said conductive thin film has a thickness of not more than 0.5 mm and a volume resistivity of not more than $10^5$ Ω·cm, and said tread is made from a rubber composition comprising a diene rubber and 40 to 100 parts by weight of silica having a BET specific surface area of 100 to 300 $m^2$/g per 100 parts by weight of said diene rubber, the content of said silica being at least 50% by weight based on the whole filler incorporated in said composition.

The term "surface of tread" or "tread surface" as used herein includes the surface of the groove portion formed in the tread.

The conductive thin film is applicable to various tread rubbers. Even if a tread rubber is poor in conductivity, the problem in accumulation of static electricity can be solved by forming the conductive thin film on the tread surface. The tread prepared from the rubber composition as defined above has excellent rolling characteristics and, therefore, the pneumatic tire according to the present invention can achieve a low fuel cost and a high conductivity. The conductive thin film provided on the tread surface disappears at the ground-contacting surface by abrasion after running in a while and the tread rubber appears at the surface, while the conductive thin film remaining at the groove portion and shoulder portion of the tread still serves to impart the conductivity to the tread. Therefore, even if a rubber having a high rolling resistance is used in the conductive thin film, it does not lead to increase of fuel cost.

The conductive thin film can be prepared from a rubber composition containing at least 10 parts by weight of carbon black per 100 parts by weight of a rubber.

DETAILED DESCRIPTION

The conductive thin film according to the present invention to be provided on the surface of a tread of a tire has a volume resistivity of not more than $10^5$ Ω·cm, preferably not more than $10^2$ Ω·cm, more preferably not more than 10 Ω·cm.

Figure 1:
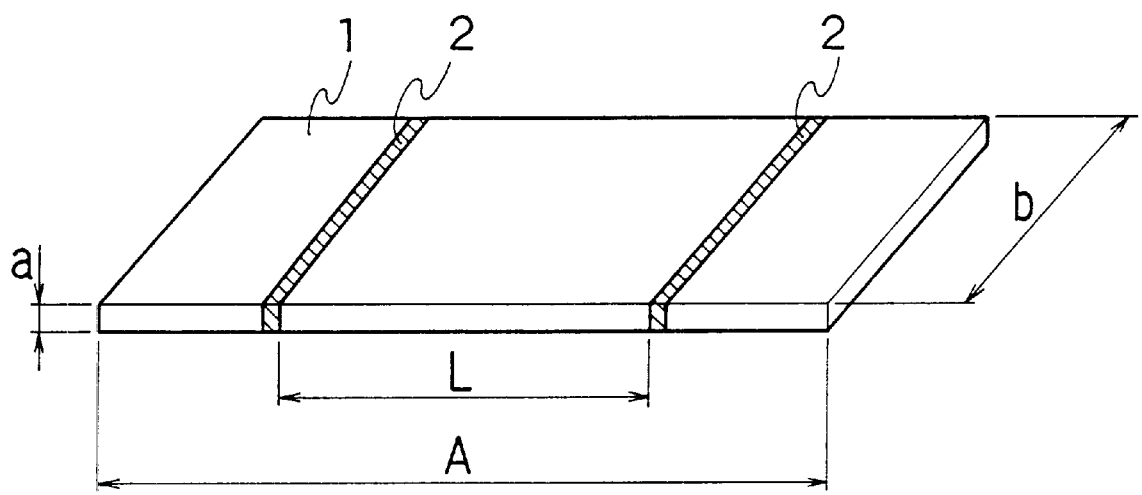
FIG. 1 is a schematic view for helping one understand measurement of the volume resistivity of a rubber.

The volume resistivity (Rv) is a resistance value represented by the following equation:

$$Rv=(a \times b \times R)/L$$

wherein R is, as shown in FIG. 1, a resistance between electrodes 2, 2 (distance L between the electrodes) provided on a rectangular cured rubber sheet 1 having thickness a, width b and optional length A, for instance, by coating a conductive paint.

The conductive thin film having a low volume resistivity is readily obtained from a rubber composition containing at least 10 parts by weight of carbon black per 100 parts by weight of a rubber.

A suitable rubber composition for forming the conductive thin film comprises a diene rubber, such as natural rubber, butadiene rubber, styrene-butadiene rubber and other known diene rubbers, and at least 10 parts by weight, preferably at least 30 parts by weight, of carbon black per 100 parts by weight of the rubber. In general, carbon black is used in an amount of at most 80 parts by weight, preferably at most 60 parts by weight, per 100 parts, by weight of the rubber.

The kind of carbon black is not particularly limited, but carbon black having an average particle size of not more than 40 nm, especially not more than 30 nm, and a DBP oil absorption of not less than 150 ml/100 g, especially not less than 180 ml/100 g, more especially not less than 200 ml/100 g, is preferred, since a thin rubber film having an excellent conductivity is obtained even if the carbon black is used in a less amount, e.g. 10 to 30 parts by weight.

The rubber composition for forming the conductive thin film may be incorporated with various additives usually employed for rubbers, as occasion demands, e.g. a curing agent such as sulfur, a curing accelerator, an antioxidant, an activator such as stearic acid or zinc oxide, a process oil and others.

The thickness of the conductive thin rubber film is at most 0.5 mm preferably at most 0.3 mm, more preferably at most 0.1 mm. Since in general the conductive thin film rubber has a large rolling resistance and is inferior in grip characteristics as compared with a tread, rubber, demand for low fuel cost cannot be satisfied and also desired grip characteristics are not obtained, if the conductive thin film is worn away to expose the underlying tread rubber at the surface in running of less than 1,000 km. If the thickness of the conductive thin film is more than 0.5 mm, it takes a long time before the tread rubber under the thin film is exposed at the surface, during which the characteristics of the tread rubber itself required for tires cannot be exhibited.

The conductive thin film located at the ground-contacting portion of a tire tread disappears by abrasion or the like when a car is run a certain distance, thus resulting in exposure of the tread rubber which is usually poor in conductivity. However, the thin film located at the groove portion and the shoulder portion of the tread still remains and, therefore, the conductivity of the tread as a whole does not decrease, thus causing no problem of accumulation of static electricity as hitherto encountered.

The rubber material for constituting the tread of the pneumatic tire according to the present invention is not particularly limited, and the tread can be prepared from various rubber compositions suitable for use in tire tread.

In order to meet a demand of fuel cost reduction, it is preferable to prepare the tread from a rubber composition containing silica.

Silica having a BET specific surface area of 100 to 300 mm$^2$/g is preferred.

Silica is used in an amount of at most 100 parts by weight, preferably 40 to 100 parts by weight, per 100 parts by weight of a rubber. In addition to silica, other known inorganic fillers, such as carbon black, calcium carbonate and clay, can be used in the present invention. It is preferable that the proportion of silica based on the total weight of the fillers used is at least 50% by weight.

One or more of rubbers which have been generally used in the production of tire treads, typically a diene rubber such as natural rubber, isoprene rubber, butadiene rubber or styrene-butadiene rubber, are used as a rubber component of the composition for tire tread.

The volume resistivity Rv of the tread prepared from such a silica-containing tread rubber composition is generally not less than $10^{10}$ Ω·cm, but there is no problem with respect to the conductivity because the thin rubber layer having an excellent conductivity is provided on the tread surface as mentioned above.

Figure 2:
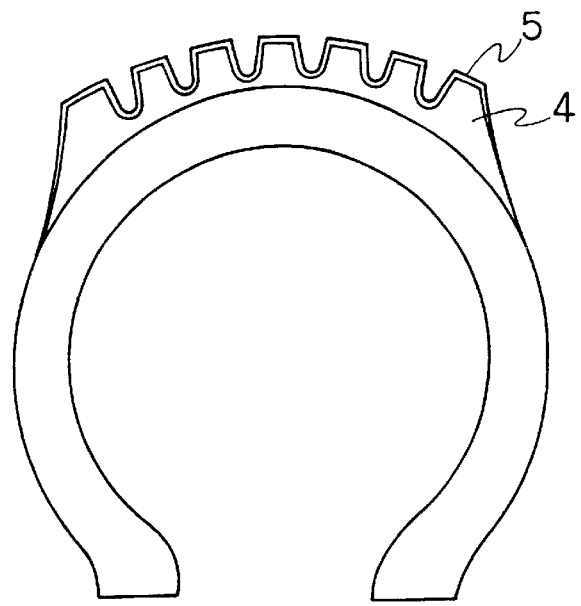
FIG. 2 is a schematic cross section view illustrating an embodiment of a pneumatic tire according to the present invention.
Figure 3:
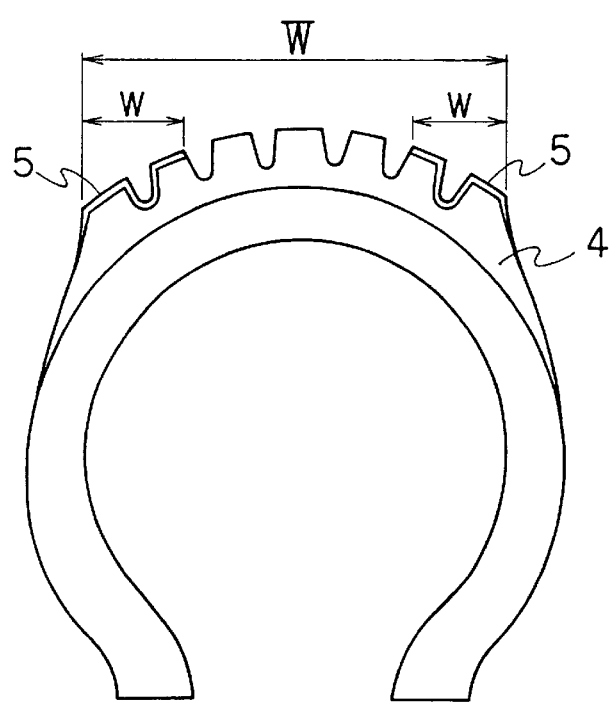
FIG. 3 is a schematic cross section view illustrating another embodiment of a pneumatic tire according to the present invention.

The conductive thin film may be provided on the tread surface continuously in the circumferential direction of the tire to cover the entire surface of tread 4 as shown in FIG. 2, or to cover only both side portions (including both shoulder portions) of tread 4 as shown in FIG. 3. In FIGS. 2 and 3, numeral 4 is the conductive thin film.

In case of providing conductive thin film 5 on only the both side portions of tread 4 as shown in FIG. 3, it is preferable that the width w (width in the horizontal direction) of the conductive thin film 5 on one side portion is from 10 to 30% of the full width W of the tread 4 between the both ends thereof, since it is necessary to provide the thin film 5 on the tread up to such a position that the thin film 5 can contact the ground when a general load is applied to the tire. By providing the conductive thin film 5 on only the both side portions of the tread 5, in other words, by not providing the conductive thin film on the tread center portion which contacts the ground regardless of the magnitude of loading, so as to expose the rubber of the tread, it is possible to exhibit the characteristics of the tread rubber itself to some extent from the initial running. Moreover, the static electricity generated or accumulated in a car body flows from a rim to the tread through bead portions, side wall portions and shoulder portions of a tire and is discharged to the ground through the conductive thin film provided on the both side portions of the tread, so static electricity can be prevented from accumulating in a car body.

The rubber composition for a tire tread according to the present invention may contain usual rubber additives used in the production of tires, e.g. a curing agent such as sulfur, a curing accelerator, an activator such as zinc oxide or stearic acid, an antioxidant, a process oil, a filler other than silica such as carbon black, calcium carbonate or clay, and the like.

The rubber compositions mentioned above can be prepared and cured in a usual manner.

The present invention is more specifically described and explained by means of the following Examples in which all parts are by weight. It is to be understood that the present invention is not limited to the Examples.

In the following Examples, properties were measured as follows:

(1) Volume Resistivity (Rv) of Rubber

A rubber composition was prepared by mixing rubber and additives other than a sulfur curing system in a BR type Banbury mixer, and then uniformly mixing the resulting mixture with the sulfur curing system including a curing agent and a curing accelerator and an antioxidant on 8 inch rolls. The prepared rubber composition was cured at 150° C. for 30 minutes to give a cured rubber sheet.

The cured rubber sheet was cut off in the direction parallel to the axis of the rolls, and after adhering an insulation tape on one surface of the sheet, a conductive paste to form electrodes was applied thereto in the form of stripe at predetermined intervals to give a rubber specimen as shown in FIG. 1 (thickness a: 1 mm, width B: 20 mm, distance L between electrodes 2: 70 mm, full length A: ≧ 100 mm).

After retaining the specimen at a temperature of 23°±2° C. for 48 hours, the resistance between the electrodes 2, 2 was measured at the same temperature, and the volume resistivity was calculated from the equation $$Rv=(a \times b \times R)/L.$$

(2) Electric Resistance of Tire

A green tire having a tread made of a prepared tread rubber composition was produced, and a uncured conductive rubber sheet having a predetermined thickness made of a rubber composition for conductive thin film was provided on the tread surface of the green tire, followed by curing to give a tire having a size of 195/65R15 (inner pressure 20 ksc).

Figure 4A:
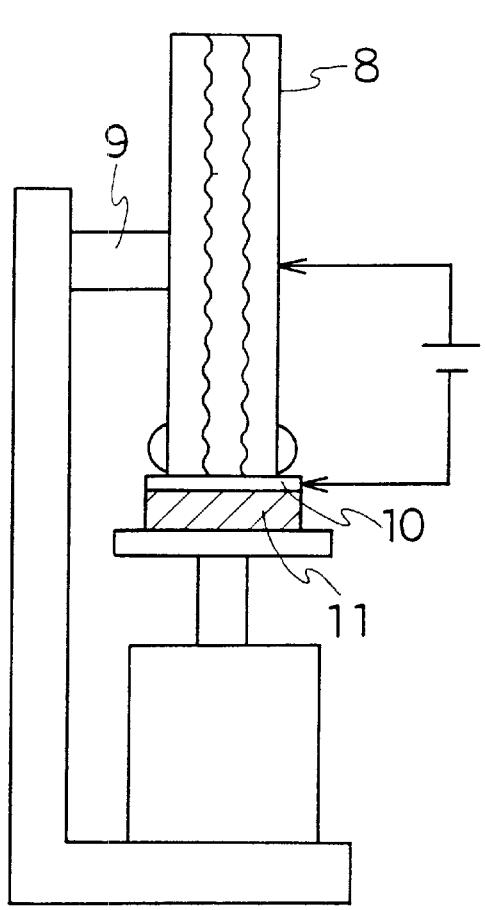
FIGS. 4a and 4b are a schematic side view and a schematic front view, respectively, illustrating measurement of the electrical resistance of a tire by a deflection machine.
Figure 4B:
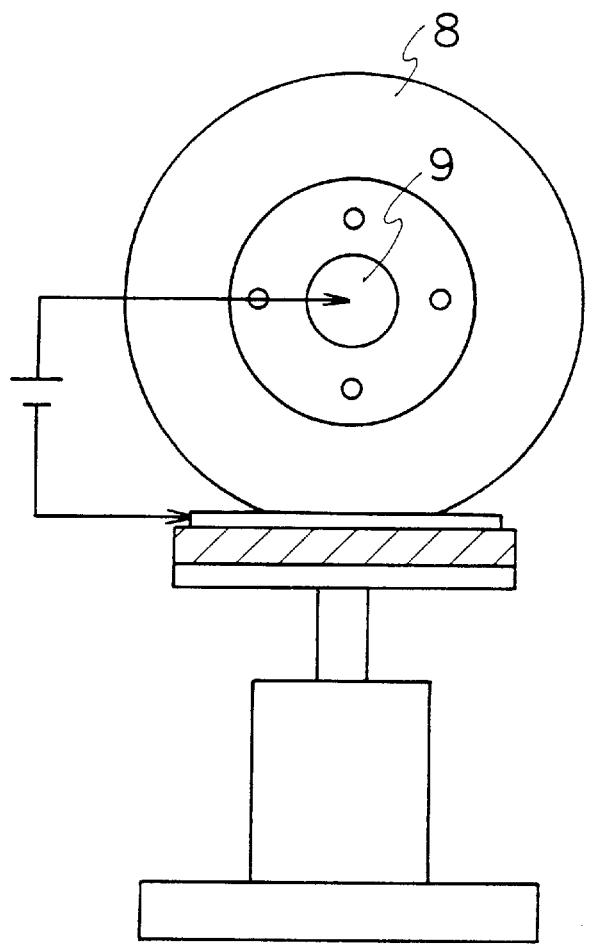

An aluminum rim was attached to the prepared tire. The tire was set on a deflection machine as shown in FIGS. 4(a) and 4(b), and the electrical resistance of the tire was measured under a load of 400 kgf. In FIGS. 4(a) and 4(b), numeral 8 is a tire, numeral 9 is a supporter for the tire, numeral 10 is a conductor (copper plate), and numeral 11 is an insulator having a resistance of at least 2,000 MΩ and capable of insulating between the conductor 10 and a hub.

(3) Thickness of Conductive Thin Film After Use

After running a predetermined distance, an edge portion of a tread block of the tire was cut off, and the thickness of the conductive thin film remaining thereon was measured. The measurement was made with respect to five tires, and the result was represented by the average value thereof.

EXAMPLE 1

Two kinds of tread rubber compositions A and B were prepared according to the recipes shown in Table 1. The volume resistivity (Rv) of cured rubbers obtained therefrom was measured according to the method described above.

The results are shown in Table 1.

The ingredients shown in Table 1 are as follows:

SBR: styrene-butadiene rubber commercially available under the trade mark "SBR 1500" made by Sumitomo Chemical Company, Limited Silica: silica having a BET specific surface area of 235 m²/g commercially available under the trade mark "Nipsil VN3" made by Nippon Silica Kogyo Kabushiki Kaisha Silane coupling agent: bis-(3-triethoxysilylpropyl-tetrasulfide) commercially available under the trade mark "Si-69" made by Degussa Co.

Antioxidant: N-phenyl-N'-(1,3-dimethylbutyl)-p-phenylenediamine commercially available under the trade mark "Nocrac 6C" made by Ouchi Shinko Kagaku Kogyo Kabushiki Kaisha Curing accelerator DPG: diphenylguanidine commercially available under the trade mark "Nocceler D" made by Ouchi Shinko Kagaku Kogyo Kabushiki Kaisha Curing accelerator CBBS: cyclohexylbenzothiazolyl-suilfeneamide commercially available under the trade mark "Nocceler CZ" made by Ouchi Shinko Kagaku Kogyo Kabushiki Kaisha

TABLE 1

| | Amount (part) | |
|---|---|---|
| Rubber composition for tread | B | A |
| Rubber component | | |
| Natural rubber | 40 | 40 |
| SBR | 60 | 60 |
| Carbon black (HAF) | — | 40 |
| Silica | 60 | — |
| Wax | 1 | 1 |
| Antioxidant | 2 | 2 |
| Stearic acid | 2 | 2 |
| Zinc oxide | 3 | 3 |
| Silane coupling agent | 5 | — |
| Sulfur | 1.5 | 1.5 |
| Accelerator DPG | 1 | 1 |
| Accelerator CBBS | 1 | 1 |
| Volume resistivity (Ω · cm) | $1.0 \times 10^{13}$ | $2.0 \times 10^{2}$ |

Rubber compositions for conductive thin film containing a varied amount of carbon black were then prepared according to the recipe shown in Table 2. The volume resistivity of cured rubbers obtained therefrom was measured according to the method described above.

The results are shown in Table 3.

In Table 2, carbon black, antioxidant and curing accelerator are as follows:

Carbon black: N220 made by Showa Cabot Kabushiki Kaisha (iodine adsorption number 121 mg, oil absorption 114 ml/100 g, average particle size 20 nm)

Antioxidant: "Nocrac 6C" made by Ouchi Shinko Kagaku Kogyo Kabushiki Kaisha

Curing accelerator CBBS: "Nocceler CZ" made by Ouchi Shinko Kagaku Kogyo Kabushiki Kaisha

TABLE 2

| Rubber composition for conductive thin film | Amount (part) |
|---|---|
| Rubber component | |
| Natural rubber | 40 |
| SBR1500 | 60 |
| Carbon black | variable |
| Wax | 1 |
| Antioxidant | 2 |
| Stearic acid | 2 |
| Zinc oxide | 3 |
| Sulfur | 1.5 |
| Accelerator CBBS | 1 |

Green tires were prepared using the tread rubber composition A or B. On the other hand, rubber sheets for the, conductive thin film having varied thicknesses were prepared using the rubber compositions for conductive thin film containing varied amounts of carbon black The rubber sheets having varied carbon black content and varied thicknesses were placed on the tread of the green tires and cured to give pneumatic tires Nos. 3 to 10 having a conductive thin film.

These tires were tested together with pneumatic tires No. 1 (tread rubber composition A) and No. 2 (tread rubber composition B) having no conductive thin film as follows:

With respect to the tire Nos. 3 to 10, the electrical resistance of the tires was measured immediately after the production thereof (running 0 km).

The tires were attached to a car, and the car was run in a test course of 5 km a round at a speed of about 80 km/hour. After running 100 km, 500 km, 1,000 km, 2,000 km, 5,000 km and 10,000 km, the electrical resistance of the tires and the thickness of the conductive thin film were measured.

The results are shown in Table 3.

TABLE 3

| Tire No. | 1 | 2 | 3 | 4 | 5 | 6 | 7 | 8 | 9 | 10 |
|---|---|---|---|---|---|---|---|---|---|---|
| Tread rubber | A | B | B | B | B | B | B | B | B | B |
| Thin rubber film | | | | | | | | | | |
| Amount of carbon black (part) | — | — | 40 | 40 | 40 | 40 | 60 | 80 | 30 | 25 |
| Thickness (mm) | — | — | 0.1 | 0.3 | 0.5 | 0.7 | 0.3 | 0.3 | 0.3 | 0.3 |
| Volume resistivity ($\Omega \cdot cm$) | — | — | $2.0 \times 10^3$ | $2.0 \times 10^3$ | $2.0 \times 10^3$ | $2.0 \times 10^3$ | $2.5 \times 10^2$ | $1.5 \times 10$ | $1.0 \times 10^5$ | $5.0 \times 10^6$ |
| Electrical resistance after running (M$\Omega$) | | | | | | | | | | |
| 0 km | 2.0 | 35.0 | 5.5 | 4.6 | 3.0 | 2.9 | 4.0 | 3.5 | 7.2 | 12.2 |
| 100 km | 2.0 | 35.0 | 5.7 | 4.8 | 3.2 | 3.1 | 4.2 | 3.6 | 7.3 | 13.2 |
| 500 km | 2.1 | 35.0 | 5.7 | 4.9 | 3.4 | 3.3 | 4.3 | 3.7 | 7.4 | 13.3 |
| 1000 km | 2.2 | 35.0 | 5.7 | 5.0 | 3.9 | 3.6 | 4.2 | 3.7 | 7.4 | 13.0 |
| 2000 km | 2.1 | 35.0 | 5.6 | 5.0 | 4.1 | 3.8 | 4.2 | 3.6 | 7.2 | 12.9 |
| 5000 km | 2.0 | 34.0 | 5.6 | 5.0 | 4.3 | 3.8 | 4.1 | 3.6 | 7.2 | 12.7 |
| 10000 km | 2.1 | 32.0 | 5.5 | 4.9 | 4.2 | 3.9 | 4.1 | 3.6 | 7.2 | 12.7 |
| Thickness of conductive thin film (mm) | | | | | | | | | | |
| 0 km | — | — | 0.1 | 0.3 | 0.5 | 0.7 | 0.3 | 0.3 | 0.3 | 0.3 |
| 100 km | — | — | 0.1 | 0.2 | 0.4 | 0.6 | 0.2 | 0.3 | 0.1 | 0.0 |
| 500 km | — | — | 0.0 | 0.1 | 0.3 | 0.5 | 0.1 | 0.2 | 0.0 | 0.0 |
| 1000 km | — | — | 0.0 | 0.0 | 0.2 | 0.4 | 0.1 | 0.2 | 0.0 | 0.0 |
| 2000 km | — | — | 0.0 | 0.0 | 0.1 | 0.2 | 0.0 | 0.1 | 0.0 | 0.0 |
| 5000 km | — | — | 0.0 | 0.0 | 0.0 | 0.1 | 0.0 | 0.0 | 0.0 | 0.0 |
| 10000 km | — | — | 0.0 | 0.0 | 0.0 | 0.0 | 0.0 | 0.0 | 0.0 | 0.0 |

It can be seen in Table 3 that even if the tread B having a poor conductivity is used in a tire, the electrical resistance of the tire can be decreased by providing a conductive thin film on the tread surface, and the electrical resistance of the tire can be made conductive up to the level of a tire (tire No. 1) having a tread prepared from the rubber composition A having an excellent conductivity.

It can also be seen that when the thickness of the conductive thin film is not more than 0.5 mm, especially not more than 0.3 mm, the thickness of the conductive thin film at the ground-containing surface becomes 0 mm in a short travel distance, especially before traveling 1,000 km, so the underlying tread rubber appears at the surface and the characteristics of the tread rubber can be exhibited in an initial traveling stage (tire Nos. 3 to 5). On the other hand, if the thickness of the conductive thin film exceeds 0.5 mm, for instance, if the thickness is 0.7 mm as seen in tire No. 6, the tread rubber does not appear at the surface before traveling of 10,000 km and, therefore, the characteristics of the tread rubber cannot be exhibited in an initial traveling stage.

Further, it can be seen from the results of tire Nos. 4 and 7 to 9 that the electrical resistance of tires decreases with increasing the content of carbon black in the conductive thin film.

EXAMPLE 2

Rubber compositions for conductive thin film containing a varied amount of carbon black were prepared according to the recipe shown in Table 2 by using four kinds of carbon black (a) to (d) having different particle size and DBP oil absorption as shown in Table 4.

TABLE 4

| Carbon black | Average particle size (nm) | DBP oil absorption (ml/100 g) |
|---|---|---|
| (a) | 22 | 115 |
| (b) | 40 | 150 |
| (c) | 30 | 180 |
| (d) | 15 | 360 |

There were prepared pneumatic tires Nos. 11 to 21 having a conductive thin film containing a varied amount of a different carbon black made from the above rubber composition on the surface of a tread made from the tread rubber composition B. The preparation of the tires was carried out in the same manner as in Example 1.

The electrical resistance of tires and the change in thickness of the conductive thin film were measured after running test in the same manner as in Example 1.

The results are shown in Table 5.

TABLE 5

| Tire No. | 11 | 12 | 13 | 14 | 15 | 16 | 17 | 18 | 19 | 20 | 21 |
|---|---|---|---|---|---|---|---|---|---|---|---|
| Tread rubber | B | B | B | B | B | B | B | B | B | B | B |
| Thin rubber film | | | | | | | | | | | |
| Carbon black: | | | | | | | | | | | |
| kind | (a) | (b) | (c) | (d) | (c) | (c) | (c) | (c) | (c) | (c) | (c) |
| amount (part) | 40 | 40 | 40 | 40 | 30 | 20 | 15 | 15 | 15 | 15 | 10 |

TABLE 5-continued

| Tire No. | 11 | 12 | 13 | 14 | 15 | 16 | 17 | 18 | 19 | 20 | 21 |
|---|---|---|---|---|---|---|---|---|---|---|---|
| Thickness (mm) | 0.3 | 0.3 | 0.3 | 0.3 | 0.3 | 0.3 | 0.1 | 0.3 | 0.5 | 0.7 | 0.3 |
| Volume resistivity ($\Omega \cdot$ cm) | $2.0 \times 10^3$ | $5.0 \times 10^2$ | $5.0 \times 10^0$ | good conductivity | $1.0 \times 10$ | $8.0 \times 10^2$ | $2.0 \times 10^3$ | $2.0 \times 10^3$ | $2.0 \times 10^3$ | $2.0 \times 10^3$ | $2.5 \times 10^6$ |
| Electrical resistance after running (M$\Omega$) | | | | | | | | | | | |
| 0 km | 4.6 | 1.7 | 0.5 | 0.1 | 1.0 | 1.8 | 4.8 | 4.5 | 4.2 | 3.9 | $10^2$ |
| 100 km | 4.8 | 1.6 | 0.6 | 0.2 | 1.1 | 1.7 | 4.9 | 4.6 | 4.1 | 4.0 | $10^4$ |
| 500 km | 4.9 | 1.7 | 0.7 | 0.2 | 1.1 | 1.8 | 5.0 | 4.4 | 4.3 | 3.9 | $10^5$ |
| 1000 km | 5.0 | 1.7 | 0.6 | 0.1 | 1.2 | 1.8 | 5.0 | 4.6 | 4.2 | 4.0 | $10^4$ |
| 2000 km | 5.0 | 1.6 | 0.5 | 0.2 | 1.1 | 1.9 | 4.9 | 4.5 | 4.2 | 4.0 | $10^3$ |
| 5000 km | 5.0 | 1.5 | 0.6 | 0.1 | 1.2 | 1.8 | 4.9 | 4.4 | 4.1 | 3.9 | $10^2$ |
| 10000 km | 4.9 | 1.5 | 0.5 | 0.1 | 1.0 | 1.7 | 4.8 | 4.4 | 4.1 | 3.8 | $10^2$ |
| Thickness of conductive thin film (mm) | | | | | | | | | | | |
| 0 km | 0.3 | 0.3 | 0.3 | 0.3 | 0.3 | 0.3 | 0.1 | 0.3 | 0.5 | 0.7 | 0.3 |
| 100 km | 0.2 | 0.3 | 0.2 | 0.3 | 0.2 | 0.1 | 0.0 | 0.1 | 0.2 | 0.5 | 0.0 |
| 500 km | 0.1 | 0.1 | 0.2 | 0.2 | 0.1 | 0.0 | 0.0 | 0.0 | 0.1 | 0.2 | 0.0 |
| 1000 km | 0.0 | 0.0 | 0.1 | 0.1 | 0.0 | 0.0 | 0.0 | 0.0 | 0.0 | 0.1 | 0.0 |
| 2000 km | 0.0 | 0.0 | 0.0 | 0.0 | 0.0 | 0.0 | 0.0 | 0.0 | 0.0 | 0.0 | 0.0 |
| 5000 km | 0.0 | 0.0 | 0.0 | 0.0 | 0.0 | 0.0 | 0.0 | 0.0 | 0.0 | 0.0 | 0.0 |
| 10000 km | 0.0 | 0.0 | 0.0 | 0.0 | 0.0 | 0.0 | 0.0 | 0.0 | 0.0 | 0.0 | 0.0 |

As understood from the results of tire Nos. 11 to 14, even if the amount of carbon black is the same, the volume resistivity of the conductive thin film changes if the kind of carbon black is changed. In particular, the larger the DPB oil absorption, the lower the volume resistivity, namely the better the conductivity. Further, as apparent from comparison of tire Nos. 12 to 14 with tire No. 1 having no conductive thin film shown in Table 1 which corresponds to a tire having a conventional tread containing carbon black, it is possible to lower the electrical resistance of tires to a lower level than that of a conventional tread by using the conductive thin film containing a carbon black having a large DBP oil absorption.

It can be seen from Table 5 that if carbon black has an excellent conductivity, the use of carbon black in an amount of not less than 10 parts by weight is sufficient to improve the conductivity of tires. It can also be seen that since the abrasion resistance of the conductive thin film is decreased by decreasing the amount of carbon black, the underlying tread rubber is exposed within running of less than 1,000 km even if the conductive thin film has a thickness of 0.5 mm.

EXAMPLE 3

In this Example, the tread of tires was prepared from the rubber composition B shown in Table 1, and the conductive thin film was prepared from a rubber composition according to the recipe shown in Table 2 wherein N220 made by Showa Cabot Kabushiki Kaisha was used as carbon black.

Pneumatic tires Nos. 22 to 30 having a conductive thin film were prepared in the same manner as in Example 1 except that the amount of carbon black in the rubber composition for conductive thin film and the proportion of the disposition of conductive thin film were changed as shown in Table 6.

The proportion of the disposition of conductive thin film (hereinafter referred also as "thin film disposition rate") is a percentage (%) of the width (w) of the conductive thin film on one edge portion of a tread with respect to the full width (W) of the tread [(w/W)×100] as shown in FIG. 3. The tire No. 22 (thin film disposition rate 50%) is a tire having a conductive thin film on the whole surface of the tread.

The electrical resistance of tire and the thickness of the conductive thin film were measured after running in the same manner as in Example 1.

The results are shown in Table 6.

TABLE 6

| Tire No. | 22 | 23 | 24 | 25 | 26 | 27 | 28 | 29 | 30 |
|---|---|---|---|---|---|---|---|---|---|
| Tread rubber | B | B | B | B | B | B | B | B | B |
| Thin rubber film | | | | | | | | | |
| Amount of Carbon black (part) | 40 | 40 | 40 | 40 | 40 | 60 | 80 | 35 | 25 |
| Thickness (mm) | 0.3 | 0.3 | 0.3 | 0.3 | 0.3 | 0.3 | 0.3 | 0.3 | 0.3 |
| Volume resistivity ($\Omega \cdot$ cm) | $2.0 \times 10^3$ | $2.0 \times 10^3$ | $2.0 \times 10^3$ | $2.0 \times 10^3$ | $2.0 \times 10^3$ | $2.5 \times 10^2$ | $1.5 \times 10$ | $1.0 \times 10^3$ | $5.0 \times 10^8$ |
| Thin film disposition rate (%) | 50 | 30 | 15 | 10 | 5 | 15 | 15 | 15 | 15 |
| Electrical resistance after running (M$\Omega$) | | | | | | | | | |
| 0 km | 4.6 | 4.6 | 4.7 | 4.8 | 4.8 | 4.0 | 3.6 | 7.3 | 12.5 |
| 100 km | 4.8 | 4.7 | 4.8 | 5.0 | 5.6 | 4.1 | 3.7 | 7.4 | 12.9 |

TABLE 6-continued

| Tire No. | 22 | 23 | 24 | 25 | 26 | 27 | 28 | 29 | 30 |
|---|---|---|---|---|---|---|---|---|---|
| 500 km | 4.9 | 4.9 | 4.9 | 5.1 | 5.1 | 4.3 | 3.7 | 7.4 | 12.7 |
| 1000 km | 5.0 | 4.9 | 4.9 | 5.1 | 5.1 | 4.2 | 3.8 | 7.5 | 12.7 |
| 2000 km | 5.0 | 5.0 | 4.9 | 5.2 | 5.2 | 4.3 | 3.7 | 7.4 | 12.8 |
| 5000 km | 5.0 | 4.9 | 4.8 | 5.0 | 5.0 | 4.2 | 3.8 | 7.3 | 12.7 |
| 10000 km | 4.9 | 4.9 | 4.8 | 5.1 | 5.1 | 4.3 | 3.7 | 7.2 | 12.7 |
| Thickness of conductive thin film (mm) | | | | | | | | | |
| 0 km | 0.3 | 0.3 | 0.3 | 0.3 | 0.3 | 0.3 | 0.3 | 0.3 | 0.3 |
| 100 km | 0.2 | 0.2 | 0.2 | 0.2 | 0.1 | 0.2 | 0.2 | 0.1 | 0.1 |
| 500 km | 0.1 | 0.1 | 0.1 | 0.1 | 0.1 | 0.1 | 0.2 | 0.1 | 0.0 |
| 1000 km | 0.0 | 0.0 | 0.0 | 0.0 | 0.0 | 0.0 | 0.1 | 0.0 | 0.0 |
| 2000 km | 0.0 | 0.0 | 0.0 | 0.0 | 0.0 | 0.0 | 0.0 | 0.0 | 0.0 |
| 5000 km | 0.0 | 0.0 | 0.0 | 0.0 | 0.0 | 0.0 | 0.0 | 0.0 | 0.0 |
| 10000 km | 0.0 | 0.0 | 0.0 | 0.0 | 0.0 | 0.0 | 0.0 | 0.0 | 0.0 |

It can be seen from the results shown in Table 6 (tire Nos. 22 to 26) that tires provided with the conductive thin film having the same carbon black content and thickness have a similar electrical resistance, even if the thin film is not disposed at the center portion of the tread, and the conductivity can be improved if the conductive thin film is disposed on both edge portions of the tread in a certain proportion, and the conductivity tends to slightly decrease if the thin film disposition rate is lower than 10%.

Also, it can be seen from the results shown in Table 6 (tire Nos. 24 and 27 to 30) that in case that the thin film disposition rate is the same, the conductivity decreases if the content of carbon black is decreased.

In order to observe the relationship between the thin film disposition rate and a load applied to a tire with respect to the conductivity of tire, the electrical resistance of tire Nos. 25 and 26 travelled 10,000 km was measured under a load of a deflection machine shown in Table 7.

The results are shown in Table 7.

TABLE 7

| | Electrical resistance | |
|---|---|---|
| Tire No. | 25 | 26 |
| Load: 0 kgf | 4.9 | 35.1 |
| 100 kgf | 4.9 | 35.0 |
| 200 kgf | 4.9 | 35.0 |
| 400 kgf | 4.9 | 5.0 |
| 600 kgf | 4.9 | 5.0 |

As apparent from the results shown in Table 7, in case of tire No. 26 whose thin film disposition rate is 5%, the electrical resistance is large when the load is less than 400 kgf, and the electrical resistance becomes approximately identical with that of tire No. 25 whose thin film disposition rate is 10% when the load is not less than 400 kgf. It is readily understood therefrom that tires whose thin film disposition rate is as small as less than 10%, the conductive thin film cannot contact the ground under a low loading, so the effect produced by disposing a conductive thin film is not exhibited.

In addition to the ingredients used in the Examples, other ingredients can be used in the Examples as set forth in the specification to obtain substantially the same results.

What we claim is:

1. A pneumatic tire comprising a tread and a conductive thin film provided on the surface of said tread continuously in the circumferential direction of the tire,
   wherein said conductive thin film is made from a rubber composition comprising a rubber and at least 10 parts by weight of carbon black per 100 parts by weight of said rubber, said carbon black has an average particle size of at most 40 nm and a DBP oil absorption of at least 150 ml/100 g, and said conductive thin film has a thickness of 0.1 to 0.5 mm and a volume resistivity of not more than $10^5$ Ω·cm, and said conductive thin film is provided on at least both edge portions of said tread, and the width in the direction from one edge toward the center of said tread of said conductive thin film located on one side of the tread is from 10 to 50% of the full width of said tread; and
   said tread is made from a rubber composition comprising a diene rubber and 40 to 100 parts by weight of silica having a BET specific surface area of 100 to 300 $m^2$/g per 100 parts by weight of said diene rubber, the content of said silica being at least 50% by weight based on the whole filler incorporated in said composition.

2. The pneumatic tire of claim 1, wherein said rubber used in said conductive thin film is at least one diene rubber selected from the group consisting of natural rubber, butadiene rubber and styrene-butadiene rubber.

3. The pneumatic tire of claim 1, wherein said diene rubber used in said tread is at least one rubber selected from the group consisting of natural rubber, isoprene rubber, butadiene rubber and styrene-butadiene rubber.

4. The pneumatic tire of claim 1, wherein said carbon black is present in an amount of from 30 to 60 parts by weight per 100 parts by weight of said rubber.

5. The pneumatic tire of claim 1, wherein said carbon black has an average particle size of not more than 30 nm.

6. The pneumatic tire of claim 1, wherein said carbon black has a DBP oil absorption of not less than 200 ml/100 g.

7. The pneumatic tire of claim 1, wherein the width in the direction from one edge toward the center of said tread of said conductive thin film located on one side of the tread is from 10 to 30% of the full width of said tread.

* * * * *